(12) United States Patent
Yano et al.

(10) Patent No.: US 6,229,529 B1
(45) Date of Patent: May 8, 2001

(54) WRITE POINT DETECTING CIRCUIT TO DETECT MULTIPLE WRITE POINTS

(75) Inventors: Takashi Yano, Tokyo; Makoto Tanaka, Kamakura; Kunikazu Tsuda, Sagamihara, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/108,600

(22) Filed: Jul. 1, 1998

(30) Foreign Application Priority Data

Jul. 11, 1997 (JP) .................................................... 9-186119

(51) Int. Cl.$^7$ ............................. G09G 5/00; G06K 11/14; G06K 11/08
(52) U.S. Cl. ..................... 345/175; 345/177; 178/18.04; 178/18.09
(58) Field of Search ..................................... 345/173, 174, 345/175, 176, 177, 178, 179; 178/18.01, 18.03, 18.04, 18.09, 20.01, 20.03, 20.04; 341/5

(56) References Cited

U.S. PATENT DOCUMENTS

| | | | |
|---|---|---|---|
| 4,553,842 | 11/1985 | Griffin | 345/175 |
| 5,196,836 | 3/1993 | Williams | 178/18.09 |
| 5,825,352 * | 10/1998 | Bisset et al. | 345/173 |
| 5,861,874 * | 1/1999 | Joto | 345/173 |
| 5,862,049 * | 1/1999 | Sato et al. | 178/18.04 |
| 5,896,126 * | 4/1999 | Shieh | 345/173 |
| 5,902,967 * | 5/1999 | Teterwak | 178/18.01 |
| 5,920,309 * | 7/1999 | Bisset et al. | 178/20.04 |
| 5,936,207 * | 8/1999 | Kobayashi et al. | 178/18.04 |
| 5,943,043 * | 8/1999 | Furuhata et al. | 345/173 |
| 5,956,020 * | 9/1999 | D'Amico et al. | 345/173 |
| 5,986,224 * | 11/1999 | Kent | 178/18.04 |
| 6,005,555 * | 12/1999 | Katsurahira et al. | 345/174 |
| 6,008,800 * | 12/1999 | Pryor | 345/175 |
| 6,023,265 * | 2/2000 | Lee | 345/173 |

FOREIGN PATENT DOCUMENTS 217628A 12/1986 (GB).

OTHER PUBLICATIONS

Patent Abstract of Japanese Publication 08–305481, Published Nov. 22, 1996.
Patent Abstract of Japanese Publication 09–091094 A, Published Apr. 4, 1997.

* cited by examiner

*Primary Examiner*—Steven J. Saras
*Assistant Examiner*—Paul Bell
(74) *Attorney, Agent, or Firm*—Cooper & Dunham LLP

(57) ABSTRACT

A coordinate input device that selects actual write points from coordinates that can be combined in different ways to define a greater number of potential write points. In the example of detecting X-coordinates and Y-coordinates that can be combined into X,Y pairs defining potential write points, the device identifies as X,Y pairs for actual write pairs the X,Y combinations that are most likely to correspond to actual write points, based on factors such as the time of detection of an X-coordinate relative to the times of detection of Y-coordinates (or vice versa), or the distances between actual points found in a preceding time period and the potential points of a current time period, or the distances between coordinates of actual points found in a preceding time period and corresponding coordinates of potential write points identified in a current time period.

30 Claims, 15 Drawing Sheets

WRITE POINT DETECTING CIRCUIT TO DETECT MULTIPLE WRITE POINTS

BACKGROUND

1. Field

The disclosed system and method pertain to detecting the coordinates of write points indicated at a panel and using those coordinates to affect an image displayed at a display screen, and pertain more particularly to resolving ambiguities when plural points are indicated concurrently that generate detected coordinates yielding combinations of coordinates that identify more potential write points than the actual write points.

2. Related Technology

In one known system, a user can designate points on an initial image shown at a display screen by touching a transparent touch panel over a display screen. The touch panel detects the coordinates of the points that the user touches and provides these coordinates to a computer that drives the display screen so that, for example, these points can be displayed superimposed on an initial image on the screen. Japanese Laid-Open Patent Application No. 8-305481 filed on Apr. 28, 1995 and laid open on Nov. 22, 1996, and incorporated herein by reference, discusses a coordinate input system of this type. The Japanese publication proposes the use of surface acoustic waves (SAW) to detect the coordinates of points that the user has indicated by touching a transparent writing panel, in the manner illustrated in FIG. 1. As seen in FIG. 1, the coordinate input device comprises a transparent writing panel 1 covering a display screen of an image display system. The transparent writing panel 1 is made of glass and is a rectangle having two vertical sides and two horizontal sides. Assuming that the X-axis is horizontal and the Y-axis is vertical, the position of a point on the writing panel 1 can be defined by a set of an X-coordinate and a Y-coordinate that are detected and are input to the image display system.

As seen in FIG. 1, a transmitting transducer 2 and a receiving transducer 3 are provided at the upper left and lower left corners, respectively, of the writing panel 1 and both face the right side of the writing panel 1. The transmitting transducer 2 transmits surface acoustic waves (SAW) horizontally to the right to propagate within the writing panel 1. The receiving transducer 3 receives the SAW from the transmitting transducer 2 through reflection. A transmitting transducer 4 and a receiving transducer 5 are provided at a lower left and right corners, respectively, of the writing panel 1 and both face the upper side of the writing panel 1. The transmitting transducer 4 transmits surface acoustic waves (SAW) vertically up so as to propagate the SAW within the writing panel 1. The receiving transducer 5 receives the SAW from the transmitting transducer 4 through reflection. Two arrays of reflectors 6 are provided on the horizontal sides of the writing panel 1, and two arrays of reflectors 7 are provided on the vertical sides of the writing panel 1, all arrayed at respective angles. Each of the reflectors 6 on the upper side of the writing panel 1 reflects a part of the SAW energy from the transmitting transducer 2 vertically down, and each of the reflectors 6 on the lower side of the writing board 1 further reflect the SAW energy received from the upper reflectors 6 to the receiving transducer 3. Each of the reflectors 7 on the left side of the writing panel 1 reflects the SAW energy from the transmitting transducer 4 horizontally to the right, and the reflectors 7 on the right side of the writing panel 1 further reflect the SAW energy received from the left-side reflectors 7 to the receiving transducer 5. Each reflector is partly transmissive so that it reflects a part of the SAW energy it receives and transmits a part of that SAW energy.

Still referring to FIG. 1, the tip of an input pen 8 is made of rubber or a rubber-like material. A user specifies a write point on the writing panel 1 by pressing or touching the tip of pen 8 at a specific position of the writing panel. SAW energy from the transmitting transducer 2 travels in the X-direction to the right. Each upper reflector 6 both transmits some of that SAW energy to the right in the X-direction and reflects some of the SAW energy down in the Y-direction to travel through the panel 1 and to be received by a corresponding one of the lower reflectors 6. The SAW from the transmitting transducer 4 similarly travel up along the left side of panel 1 to be partly transmitted and partly reflected at each of the left reflectors 7. The SAW energy that is reflected to the right in the X-direction by the left reflectors 7 travels within the writing panel 1 to the respective reflectors 7 at the right side of panel 1, and the SAW energy received at those reflectors 7 on the right side is sent to the receiving transducer 5 down in the Y-direction through the partly reflective and partly transmissive right reflectors 7. Whenever the tip of input pen 8 presses or touches the panel 1, the transmission of SAW energy through that point is inhibited or attenuated.

In the device of FIG. 1, the travel time of the SAW energy from the transmitting transducer 2 to the receiving transducer 3 via a respective pair of vertically aligned upper and lower reflectors 6 depends on the distances of those reflectors 6 from the left side of the writing panel 1 along the X-axis. By normalizing detection signals output by the receiving transducer 3, the distance of each of the reflectors 6 can be converted into a variable in terms of a time axis. The propagation of the SAW within the writing panel 1 is inhibited or attenuated only at the write point specified by the input pen 8. By locating a particular vertically aligned pair of reflectors 6 for which the detection signal output by receiving transducer 3 is inhibited or attenuated, the X-coordinate of the write point on the writing panel 1 can be detected. In a similar manner, by using the transmitting transducer 4, the receiving transducer 5 and reflectors 7, the Y-coordinate of the write point on the writing panel 1 can be detected.

Another type of known coordinate input device uses electromagnetic induction to detect the coordinates of an input image on a writing panel instead of using SAW energy.

Yet another earlier coordinate input device is discussed in Japanese Laid-Open Patent Application No.9-91094 filed on Sep. 21, 1995 and laid open on Apr. 4, 1997, and incorporated herein by reference. This Japanese application proposes the use of light to detect the coordinates of write points on a transparent writing panel. FIG. 2 illustrates a coordinate input device of this type. As seen in FIG. 2, this coordinate input device has a transparent writing panel 1 covering a display screen of an image display system, light scanners 21 and 22 at a lower left and right corners respectively, of the writing panel 1, a corner cube arrays 23 at the top of the writing panel 1, and corner cube arrays 24 and 25 at the left and right sides, respectively, of the writing panel 1. The transparent writing panel 1 is made of glass and is a rectangle having two vertical sides and two horizontal sides. Assuming that the X-axis is horizontal and the Y-axis is vertical, the position of a point that a user has designated on the writing panel 1 can be defined by a set of an X-coordinate and a Y-coordinate calculated from the angles at which the light is obscured and from the known geometry of the device.

In FIG. 2, each of the light scanners 21 and 22 rotates while sending out a beam of light and receiving a reflection of that beam. The corner cube arrays 23 to 25 reflect light from the light scanners 21 and 22 back toward the light scanners when a light beam is not obstructed. When a user presses or touches a specific position of the writing panel 1 (shown by the arrow in FIG. 2) with an implement that is in the path of the light beams from the light scanners 21 and 22 (and/of in the path of the reflected light beams), the light from (and/or to) the light scanners 21 and 22 is blocked or attenuated at the contact point so the respective light beams cannot reach the appropriate corner cube array(s) and/or be reflected back toward its source, or at least cannot do so in the same amplitude as when there is no obstruction. The light scanners 21 and 22 detect the angle of the respective light beams at the time there is no reflection (or there is only attenuated reflection) to thereby detect the angles labeled $\alpha 1$ and $\beta 1$ in FIG. 2. An arithmetic circuit calculates the coordinate pair (X1,Y1) from these two angles detected by the light scanners 21 and 22 and the known dimensions of the light panel 1.

One drawback of coordinate input devices using the propagation of SAW energy is that if two points are pressed or touched concurrently by implements such as the input pen 8, for example if the pen tip is kept on one point while another is touched, as illustrated in FIG. 3, the receiving transducer 3 detects two X-coordinates (x1 and x2) and the receiving transducer 5 also detects two Y-coordinates (y1 and y2) within a single time interval in which the coordinates are read, as illustrated in FIG. 4. In this case, the write point (X1,Y1) and (X2,Y2) are not identified unambiguously because the incorrect points (x1,y2) and (x2,y1) are also detected as a potential write point (shown by circles in FIG. 3).

In the device using rotating beams of light, if plural points are pressed by the user within a given time interval, as illustrated in FIG. 5 (shown by the arrow), two angles are detected by each of the light scanners 21 and 22 within a time interval in which the coordinates area read. The light scanners 21 detects the angles $\alpha 2$ and $\alpha 3$ and the light scanners 22 detects the angles $\beta 2$ and $\beta 3$. Again, the two correct points are (X1,Y1) and (X2,Y2) but the two incorrect points (shown by circles in FIG. 5) are also detected as potential write points.

SUMMARY

An object of the system and method disclosed herein is to overcome the above and other drawbacks of known systems.

In one exemplary and non-limiting embodiment, one or more users indicate actual write points on a panel, for example by touching the panel with the tip of a pen or some other implement. A first coordinate and a second coordinate are detected for each actual write point are detected for a selected time interval. One example of detection is through the use of SAW and another is by the use of light beams as earlier discussed, but detection means can be used instead or in addition to SAW and light for the purpose. The detected coordinates provide combinations of a first and a second coordinate each for potential write points whose number exceeds that of the actual write points, whereas only the coordinates that define actual write points are desired. In order to select the coordinate combinations that define actual write points from among the combinations defining potential write points, calculations are carried out that make use of the times of detection of the first and second coordinates for the respective time interval.

In one example, the calculations make use of the time between the detection of a first coordinate and the detection of each of at least two second coordinates for the respective time interval. This example makes use of the realization that it is likely that the two coordinates of an actual point will be detected at times that are closer to each other while the two coordinates of another actual write point are likely to be detected at times that are further from each other. Depending on the type of detection of coordinates that is used in a particular implementation, these calculations can, but need not, involve adjusting the relative duration of the time intervals within which the coordinates are detected so as to facilitate the identification of the time difference between the detection of a first coordinate and the detection of two or more second coordinates for a given time interval. In another example, the calculations make use of the realization that information relating to actual write points from a previous time interval can help in selecting actual write points from among the potential write points for a current time interval. This example can involve comparing the distances between actual write points for the preceding time interval and potential write points for the current interval, or comparing the distances between a coordinate for an actual write point for a preceding time interval with the same coordinate for two or more potential write points for the current time interval. The actual points that are selected from among the potential write points in this manner can be used in a display process—for example, they can be superimposed on or integrated into another image that is being displayed, or they can be used to control or affect some other operation.

DETAILED DESCRIPTION

Figure 6:
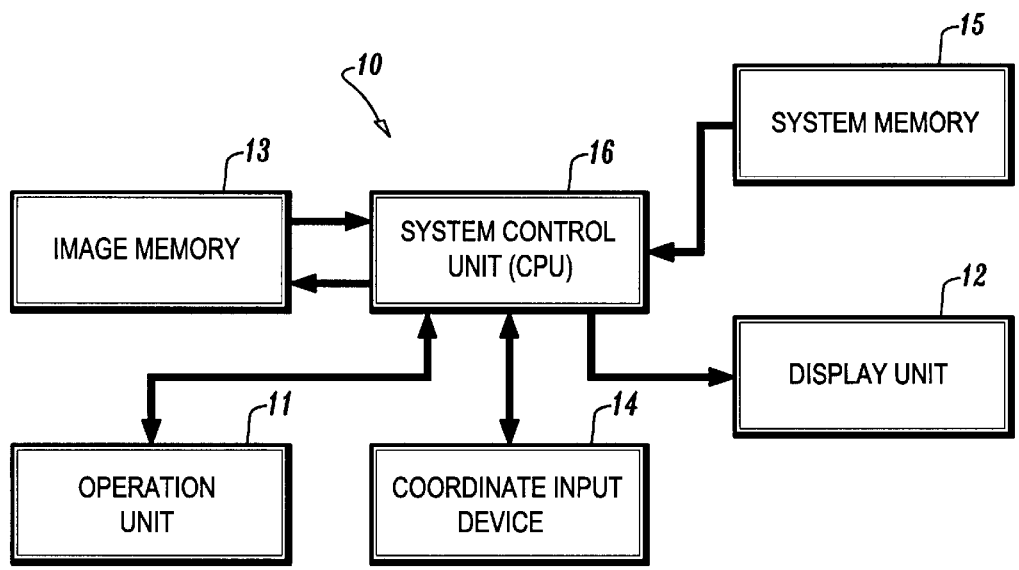
FIG. 6 is a block diagram of an image display system to which one embodiment of a coordinate input device described below is applied.
Figure 7:
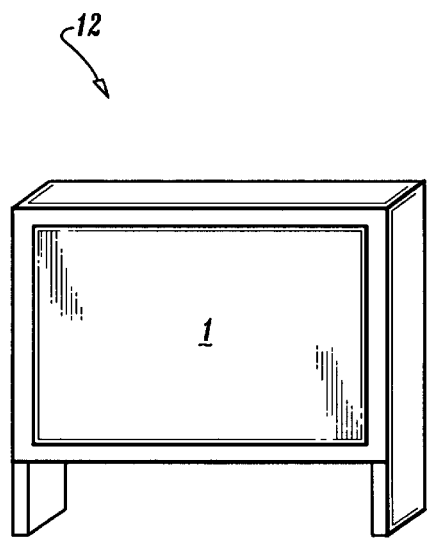
FIG. 7 is a perspective view of a display unit of the image display system of FIG. 6.

FIG. 6 illustrates an image display system to which one embodiment of the coordinate input device described herein is applied, and FIG. 7 illustrates a display unit of the image display system of FIG. 6. The image display system 10 includes a system control unit 16 to control the overall operation of the image display system 10. The system control unit 16 includes a central processing unit (CPU). A system memory 15 uses a read-only memory (ROM) although other memory means can be used instead or in addition. The system memory (ROM) 15 stores a system program executed by the system control unit (CPU) 16 in order to control the overall operation of the image display system 10, and a program executed by the system control unit (CPU) 16 in order to carry out detection of the coordinates of a write point on the writing panel 1 based on detection signals output by the coordinate input device 14.

An operation unit 11 inputs operational conditions and/or parameters to the system control unit 16 so as to set the image display system 10 in a specified operational mode when the operation unit 11 is manipulated by a user. The display unit 12 is a display part of the image display system 10 which displays an image on a display screen. An image memory 13 is a memory unit which stores image data indicative of the image being displayed on the display unit 12. The image memory 13 uses a random access memory (RAM) although it can use other memory means instead or in addition. The coordinate input device 14 has a transparent writing panel 1 which can be similar to the transparent writing panel 1 in FIG. 1. The transparent writing panel 1 covers the display screen of the display unit 12. The coordinate input device 14 detects the coordinates of write points on the writing panel 1 specified by the user or users to form an input image, and inputs the coordinates to the system control unit 16 so that the input image can be displayed on the display screen of the display unit 12 superimposed on or integrated with an initial image that also is displayed on the display screen. Alternatively, the write points can be used for other control purposes.

In the image display system 10 of FIG. 6, the operation unit 11 can include a keyboard (not shown), a mouse (not shown), an image reading device (not shown), and/or other user interface devices. An image to be displayed on a display screen of the image display system 10 can be selected or modified when the keyboard or the mouse or other input device is operated by the user. Image data of an original image can be read from either a document or a magnetic disk (or from another source) by using the image reading device or some other device, and the original image can be displayed on the display screen based on the image data.

In an exemplary and non-limiting example of the image display system 10 of FIG. 6, the display unit 12 includes a plasma display panel (PDP) having a large screen, typically larger than a normal screen of a cathode-ray tube (CRT) monitor. The display unit 12 displays an image on the PDP based on the image data supplied from the image memory 13 to the display unit 12 by the system control unit 16. As described above, the coordinate input device 14 is attached to the display unit 12 such that the transparent writing panel 1 matches the PDP of the display unit 12 in shape and size, as seen in FIG. 7. The coordinate input device 14 detects the coordinates of a write point on the writing panel 1 specified by the operator, and inputs these coordinates to the system control unit 16 so that input image is displayed on the PDP of the display unit 12 or is otherwise used.

In the image display system 10 of FIG. 6, the image memory 13 temporarily stores image data of an original image when image data is read from a document or a magnetic disk or another source by using the image reading device of the operation unit 11, and the original image is displayed on the display screen of the display unit 12 based on the image data from the image memory 13. The image memory 13 temporarily stores image data of an input image (which is formed by write points specified on the writing panel 1), e.g. separately from the image data of the original image or interleaved or integrated with the image data of the original image.

Figure 1:
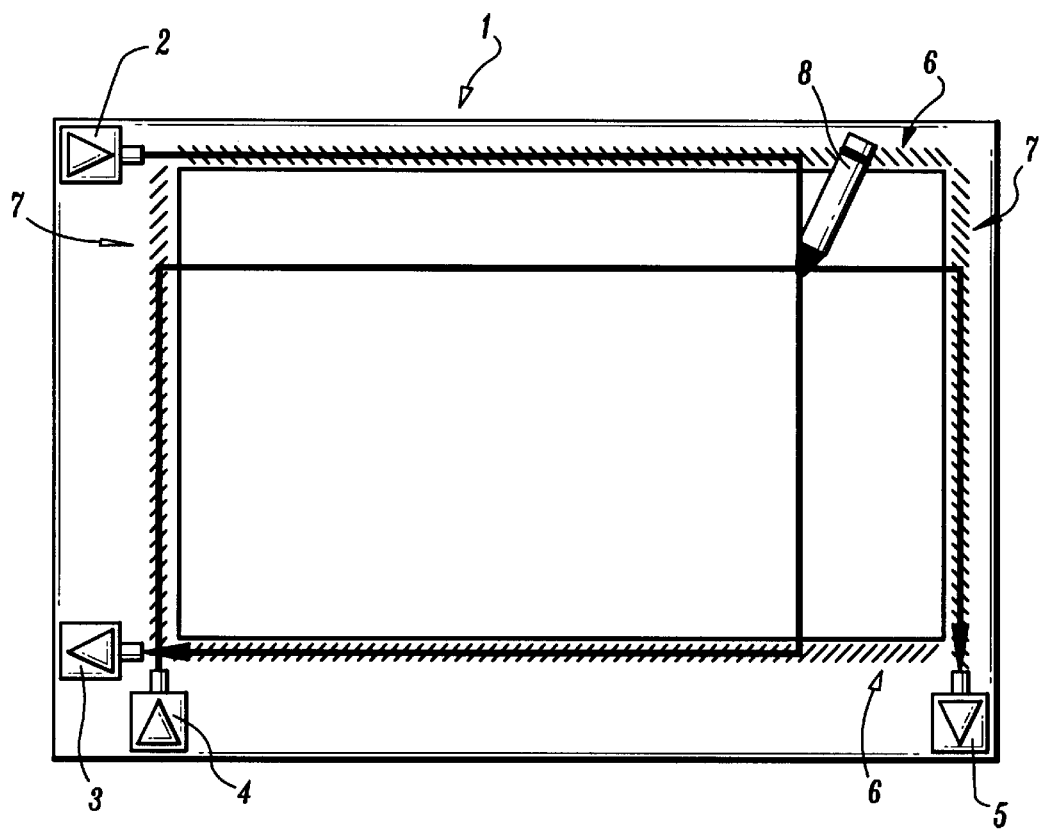
FIG. 1 illustrates an earlier coordinate input device relying that uses surface acoustic waves.

Next, a description will be now given of one embodiment of a coordinate input device with reference to FIGS. 8 to 14, where elements which correspond to elements in FIG. 1 are designated by the same reference numerals and a duplicate description thereof is omitted.

Figure 8:
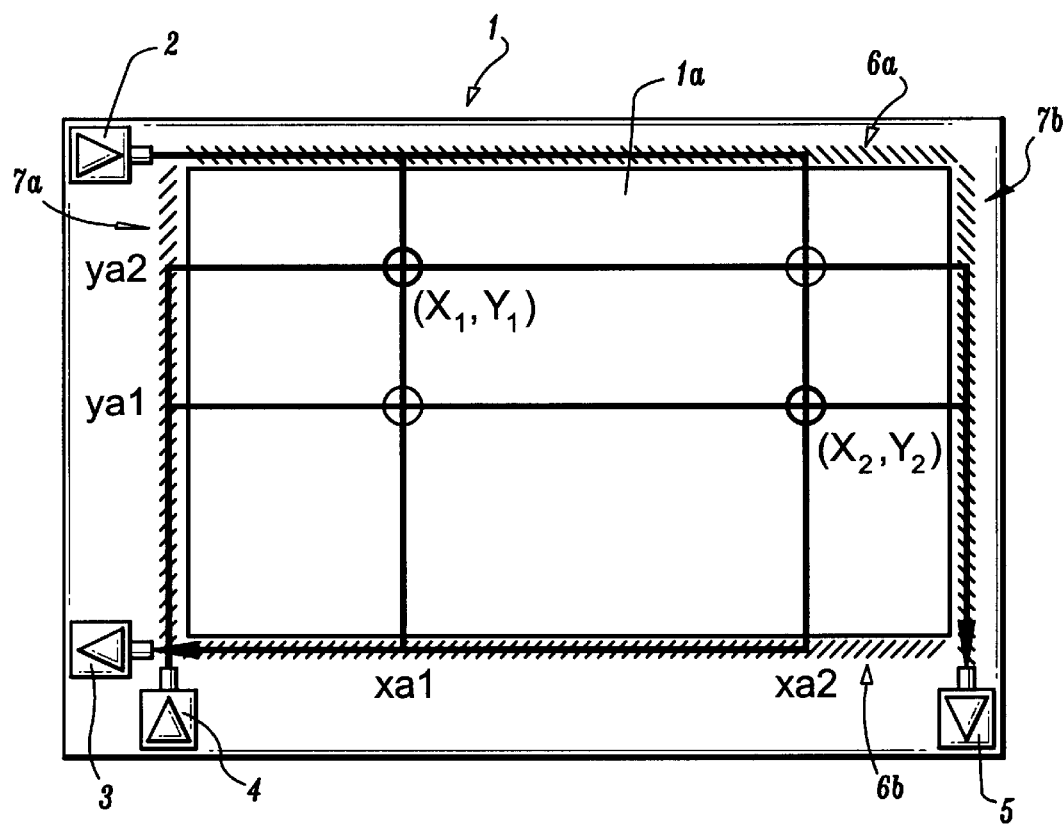
FIG. 8 illustrates one embodiment of a coordinate input device described below.

As seen in FIG. 8, the coordinate input device of this embodiment includes a transparent writing panel 1 covering the PDP screen of the display unit 12. The transparent writing panel 1 is made of glass and has a rectangular writing surface 1 a having two vertical sides and two horizontal sides. Surface acoustic waves (SAW) are propagated on the writing surface 1a of the writing panel 1. The writing panel 1 has a horizontal X-axis and a vertical Y-axis. The position of a write point on the writing panel 1 is defined by an X-coordinate and a Y-coordinate of the write point. The X-coordinate and Y-coordinate of the write point on the writing panel 1 are detected by the coordinate input device 14, and the coordinate input device 14 inputs the coordinates to the system control unit 16 of the image display system 10.

The coordinate input device of this embodiment includes the transmitting transducer 2, the receiving transducer 3, an array of reflectors 6a and an array of reflectors 6b. The transmitting transducer 2 and the receiving transducer 3 correspond to elements 2 and 3 in FIG. 1. The arrays of reflectors 6a and 6b correspond to the two arrays of reflectors 6 in FIG. 1.

In this exemplary embodiment, the transmitting transducer 2 and the receiving transducer 3 are at the upper and the lower left corners, respectively, of the writing panel 1 and both face the right side of the writing surface 1a of the writing panel 1. The transmitting transducer 2 transmits SAW energy horizontally to the right, through the partly transmissive upper reflectors 6a, which reflect SAW energy down within the writing panel 1 toward the lower reflectors 6b. The receiving transducer 3 receives SAW energy from the transmitting transducer 2 after reflection thereof from reflectors 6a, transmission through panel 1a, and reflection by the partly transmissive reflectors 6b. The reflectors 6a and the reflectors 6b are arrayed at a first angle of 135° and at a second angle of 45°, respectively, such that the reflectors 6a both transmit SAW energy from transducer 2 horizontally to the right and reflect SAW energy vertically down. The lower reflectors 6b reflect horizontally to the left the SAW energy they receive along the Y-axis from the reflectors 6a, and transmit to the left SAW energy that they receive from other reflectors 6b. The angles of the reflectors 6a and 6b relative to the X-axis are complementary, i.e., they add up to 180°. The transmitter 4, left side reflectors 7a, right side reflectors 7b, and receiver 5 operate in an analogous manner.

The coordinate input device of this embodiment includes an input pen (not shown in FIG. 8) similar to the input pen 8 in FIG. 1. The tip of the input pen is made of rubber or rubber-like material. By pressing or touching a specific location of the writing panel 1 with the tip of the input pen, the user specifies a write point on the writing panel 1. A part of the SAW energy from the transmitting transducer 2 is transmitted and a part is reflected by each of the reflectors 6a and, after reflection by reflectors 6a, travels down within the writing panel 1 along the Y-axis. The receiving transducer 3 receives SAW energy that has traveled down through panel 1 and has been reflected to the left by corresponding reflectors 6b. Such transmission and reception of SAW energy (and/or the detection of such energy) is repeated at short time intervals. The propagation of the SAW within the writing panel 1 is inhibited or attenuated at the write point specified by the input pen but is not so inhibited or attenuated at other locations of the writing surface 1.

By normalizing detection signals output by the receiving transducer 3 in response to the received SAW energy, the distance of each of the reflectors 6a and/or 6b from the left side (or from some other fixed location such as the Y-axis) of the wiring surfaces 1a is converted into a variable in terms of time axis. By locating a particular one of the reflectors 6a (and/or of the reflectors 6b) for which the detection signal output by the receiving transducer 3 is inhibited of attenuated, the X-coordinate or the write point on the writing panel 1 can be detected.

In a similar manner, by using the transmitting transducer 4, the receiving transducer 5, and the reflectors 7a and 7b, the Y-coordinate of the write point on the writing panel 1 can be detected.

Figure 9:
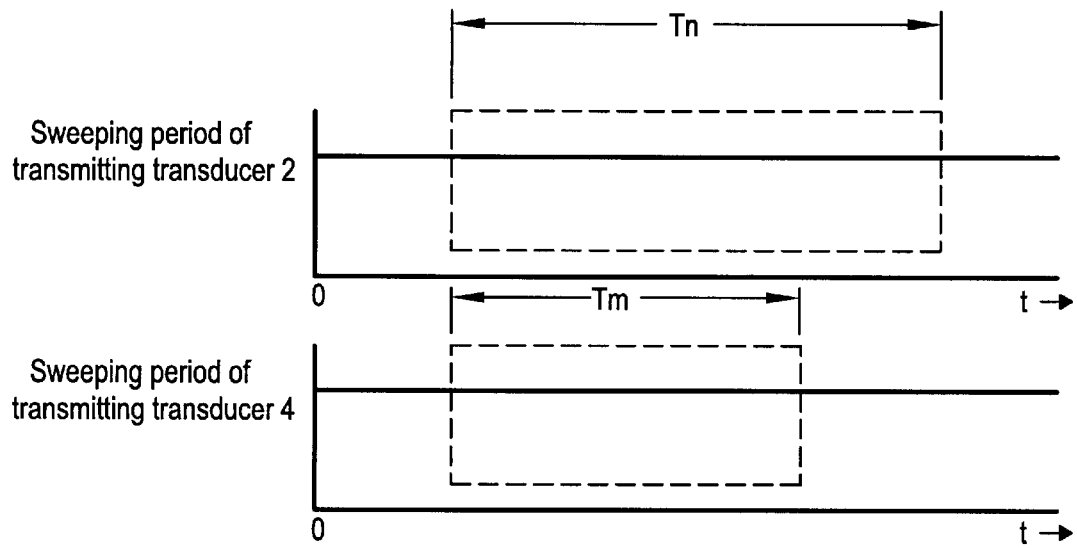
FIG. 9 illustrates sweeping periods for the coordinate input device of FIG. 8.

In FIG. 8, if one or more users press or touch plural points on the panel 1, for example point (X1,Y1) and point (X2, Y2), with input pens or similar implements, the system control unit 16 detects four potential write points including the incorrect points shown by thin line circles in FIG. 8. In this embodiment, the system control unit 16 resolves the ambiguity by considering a sweeping period (or time interval) Tm of the transmitting transducer 4 relative to a sweeping period (or time interval) Tn of the transmitting transducer 2, as illustrated in FIG. 9. In this example, the sweeping period Tm and the sweeping period Tn start at the same time under the control of the system control unit 16, and the geometry of the panel 1, transmitters 2 and 4, receivers 3 and 5, and reflectors 6a, 6b, 7a and 7b is such that the sweeping period Tn is longer than the sweeping period Tm. However, Tn and Tm can start at different times, and their relative durations can differ from the illustrated example, so long as the system control unit 16 can keep track of the starting times and durations of Tn and Tm and take those parameters into account in accordance with the principles inherent in the discussion herein.

Figure 10:
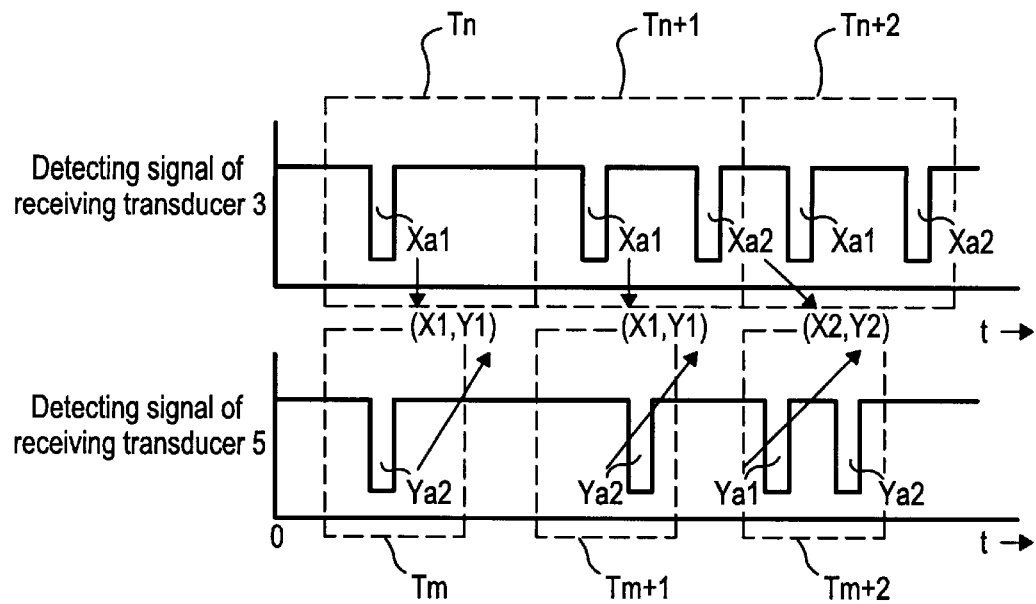
FIG. 10 illustrating a write point detection timing for the coordinate input device in FIG. 8.

When the receiving transducer 3 detects two X-coordinates Xa1 and Xa2 and the receiving transducer 5 also detects two Y-coordinates Ya1 and Ya2 for a given time interval that includes Tn and Tm, the system control unit 16 determines the X,Y coordinates of the actual write points, as distinguished from the potential but not actual points, on the basis of the times at which two values of the same coordinate are detected within the same sweeping time interval Tn. In the example of FIG. 10, one X-coordinate and one Y-coordinate are detected for sweeping period Tn and its corresponding sweeping period Tm (Xa1,Ya2), but two X-coordinates are detected for the next sweeping period Tn+1 (Xa1 and Xa2) and a single Y-coordinate Ya2 is detected for the corresponding sweeping time period Tm+1. Because a Tm period is shorter than a Tn period, this can occur when the second actual write point X2,Y2 is first touched during a Tn but after the corresponding Tm is over.

In this case, the system controller 16 determines that for Tn+1 and Tm+1, Xa1 and Ya2 are detected at times closer to each of the than Xa2 and Ya2 and, therefore, the actual write point for this time interval is X1,Y1 at Xa1,Ya2. For the next sweeping time period Tm+2, Y-coordinate Ya1 is detected and then Ya2. For the corresponding sweeping period Tn, coordinates Xa1 and Xa2 are detected. As Xa1 and Ya2 are already associated with each other to define actual write point X1,Y1 based on Tn+1 and Tm+1, system controller 16 determines for Tn+2 and Tm+2 that the second actual point X2,Y2 is at Xa2, Ya1 (and, thus, that the other two potential points defined by other combinations of an X-coordinate and a Y-coordinate each are not actual write points). If in this example two X-coordinates are detected for a Tn period and two Y-coordinates for the corresponding Tm period, the system controller 16 would compare the detection time of one of the X-coordinates, e.g., Xa1, with the detection time of Ya1 and Ya2 and pick the X,Y pair closer in detection time for one of the actual points, and then pick the remaining X-coordinate and the remaining Y-coordinate for the second actual write point. As a general principle for this example, the system controller 16 compares the time of detection of Xai (where i=1,2) and the time of detection timing of coordinate Yai (i=1,2) for each of the four potential write points. The system control unit 16 considers the calculated time differences regarding each of the combinations (Xa1,Ya1), (Xa2,Ya2), (Xa1,Ya2), (Xa2,Ya1) and selects the two combinations that have minimum time differences between the time of detection of the X-coordinate and the Y-coordinate within a particular combination. In the case of FIG. 10, Xa1 and Ya2 are detected for the corresponding sweeping periods Tn+1 and Tm+1, and Xa2 is detected for the same sweeping period Tn+1 and Ya1 is detected for the next sweeping period Tm+2. Therefore, the system control unit 16 selects the combinations (Xa1,Ya2) and (Xa2,Ya1) as corresponding to the actual write points (X1,Y1) and (X2,Y2), thus selecting the two actual write points from among the four potential write points illustrated in FIG. 8.

Figure 11:
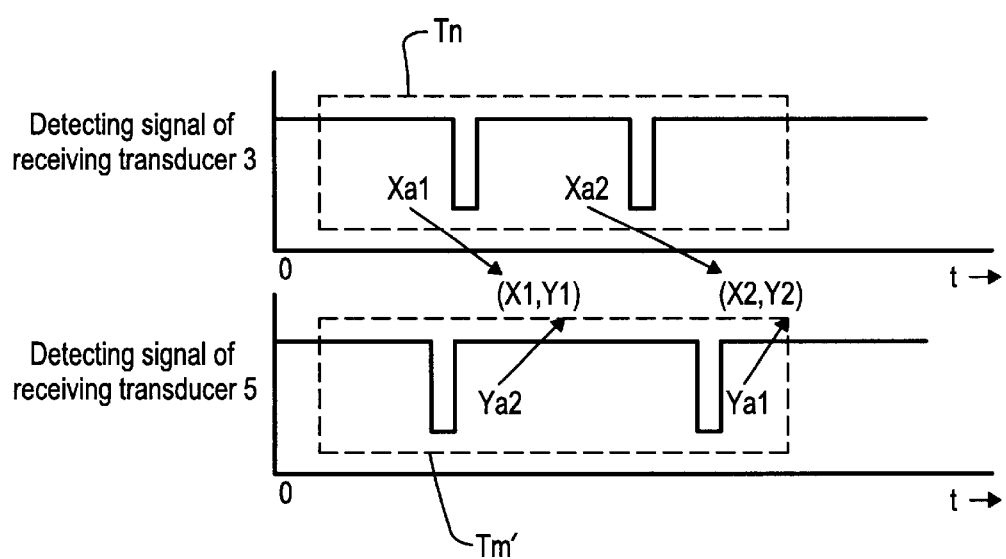
FIG. 11 illustrates another write point detection timing.

As an alternative, the coordinates of the actual write points can be identified without starting the sweeping periods Tm and Tn for a given time interval at matched times. In this alternative, the transmitting transducer 2 and the transmitting transducer 4 sweep the write panel 1 at their own cycles Tn and Tm. If the user first presses or touches plural points within a given time interval corresponding to sweeping periods Tn and Tm, for example point (X1,Y1) and point (X2,Y2) in FIG. 8, the receiving transducer 3 detects X-coordinates Xa1 and Xa2 and the receiving transducer 5 detects Y-coordinates Ya1 and Ya2. In this alternative, the system control unit 16 corrects for the difference in the durations of Tn and Tm, for example by in effect stretching the duration of Tm so that it matches that of Tn, as illustrated in FIG. 11. While the physical structure of panel 1 can remain the same, and the period Tm can remain in fact shorter than Tn, such stretching can be effected in processing the information, for example by re-timing samples of the output of receiving transducer 5 or in some other way to accomplish the arrangement illustrated in FIG. 11 without changing the actual durations of Tn and Tm. In this alternative, using the effectively stretched sweeping period Tm, the system control unit 16 selects a combination of a detected signal on the X-axis and the detected signal on the Y-axis that is nearest in time. As seen in FIG. 11, detected signals Xa1, Xa2, Ya1 and Ya2 are illustrated as they would appear after correcting for the difference in the time durations of sweeping periods Tn and Tm. In this case, Ya2 is the Y-coordinate detection that is closest in time to Xa1 and Ya1 is closest to Xa2. Therefore, the system control unit 16 selects the combination (Xa1,Ya2) and the combination (Xa2,Ya1). This approach also selects the two actual write points that are among the four potential write points.

Figure 12:
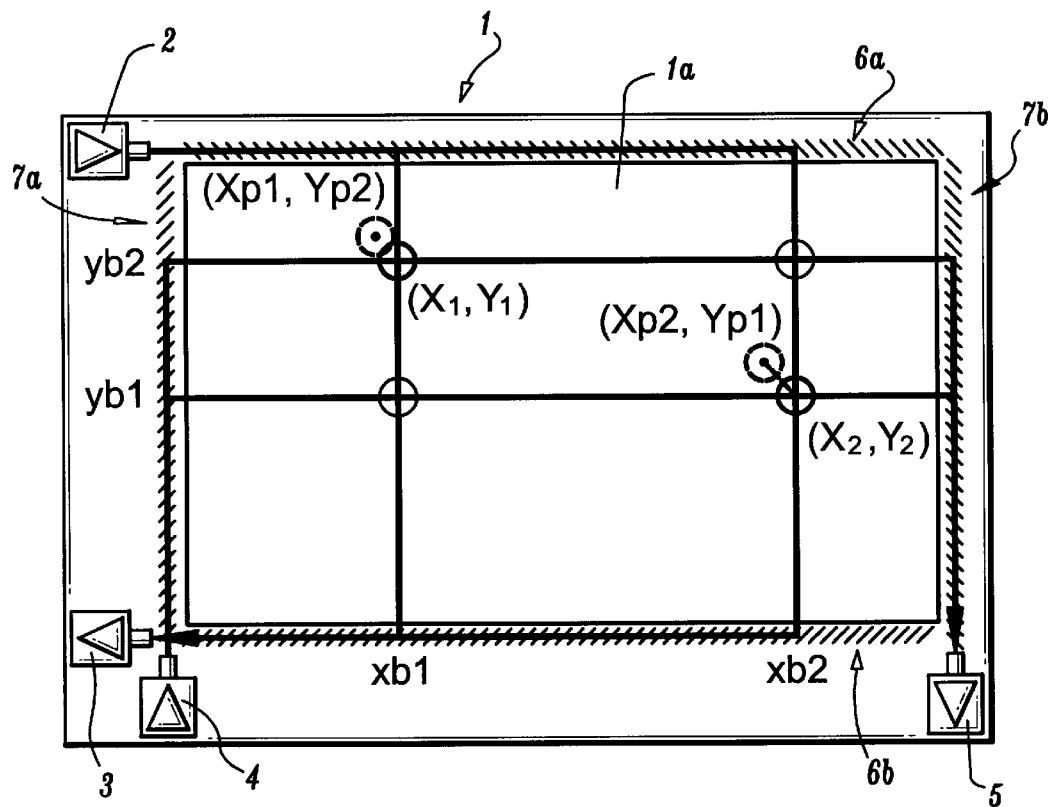
FIG. 12 illustrates another coordinate input device described below.
Figure 13A:
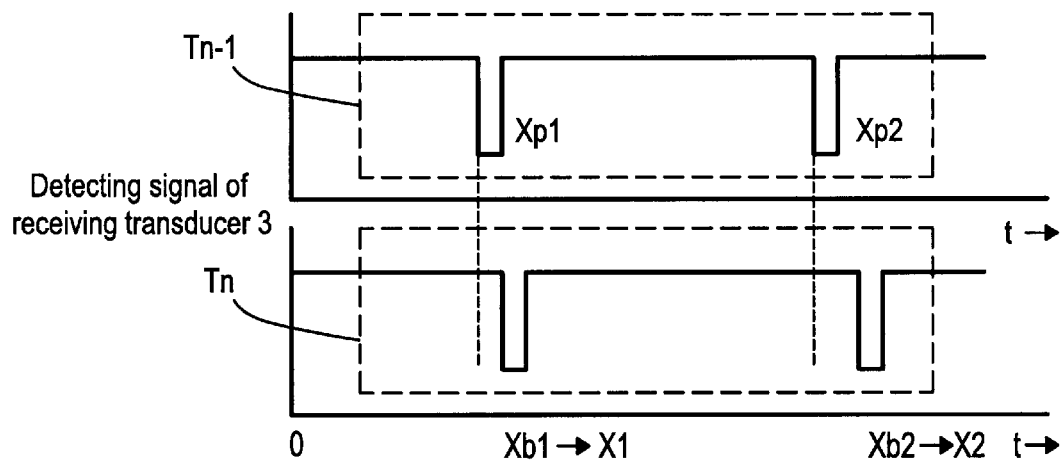
FIGS. 13a and 13b illustrate write point detection timing for the coordinate input device of FIG. 12.
Figure 13B:
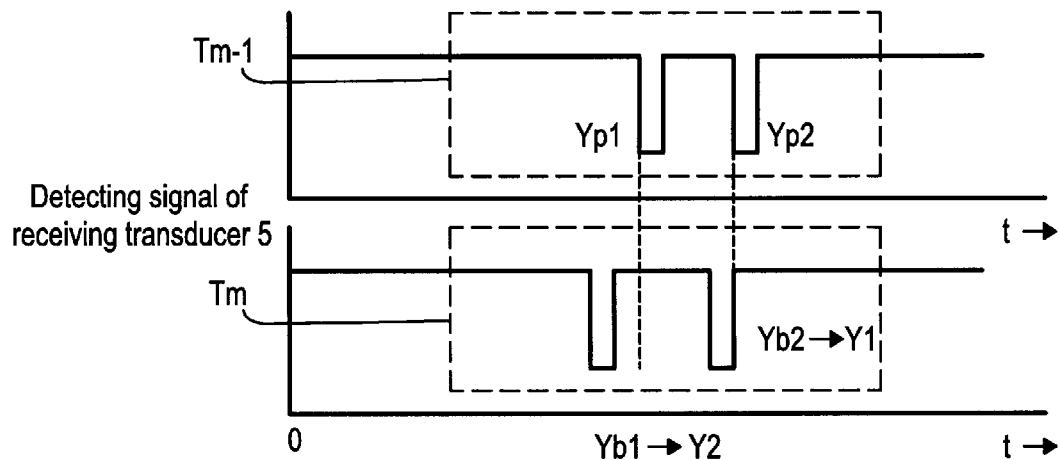

Referring to FIG. 12, assume that the user writes on panel 1 two continuous-line segments from the actual write points shown by dashed-line circles to the actual write points shown by heavy line circles, and that the points shown by the dashed line circles were selected as actual write points for a preceding time interval corresponding to sweeping periods Tn−1 and Tm−1, while the points shown by heavy line circles are for a current time interval corresponding to sweeping time periods Tn and Tm. Two X-coordinates Xb1 and Xb2 are detected for the current time interval for the same sweeping period Tn, and two Y-coordinates Yb1 and Yb2 are also detected for the current time interval for the same sweeping period Tm, as illustrated in FIGS. 13a and 13b. In this case, the system control unit 16 determines the combinations of the coordinates of the actual write points for the current time interval on the basis of the distances between the actual write points for the preceding time interval (the immediately preceding sweeping period Tm−1 and Tn−1) and the four potential write points for the current time interval (sweeping periods Tn and Tm). In particular, the system control unit 16 determines the distances D1 through D4 in accordance with the expressions set forth below, where (Xb1,Yb1), (Xb1,Yb2), (Xb2,Yb1), (Xb2, Yb2) are the coordinates of the four potential write points for the current time interval (sweeping period Tm and Tn), and (Xp1,Yp2), (Xp2,Yp1) are the coordinates of the two actual write points (shown by dashed-line circles in FIG. 12) found in the preceding time interval (the immediately preceding sweeping periods Tm−1 and Tn−1):

$$D1=|(Xb1,Yb1)-(Xp1,Yp2)|+|(Xb2,Yb2)-(Xp2,Yp1)|$$

$$D2=|(Xb1,Yb1)-(Xp2,Yp1)|+|(Xb2,Yb2)-(Xp1,Yp2)|$$

$$D3=|(Xb1,Yb2)-(Xp1,Yp2)|+|(Xb2,Yb1)-(Xp2,Yp1)|$$

$$D4=|(Xb1,Yb2)-(Xp2,Yp1)|+|(Xb2,Yb1)-(Xp1,Yp2)|$$

The system control unit 16 selects from among D1 through D4, the distance that has the minimum numerical value. In the case of FIG. 12, the system control unit 16 chooses the combination of coordinates (Xb1 ,Yb2) and (Xb2,Yb1) because D3 has the minimum numerical value. In this manner, the system control unit 16 selects the actual write points for the current time interval that have coordinates (Xb1,Yb2) and (Xb2,Yb1), with the help of the actual write points for the preceding time interval that have coordinates (Xp1 ,Yp2) and (Xp2,Yp1) despite the fact that two more potential write points are detected in the same current time interval.

An alternative to the above way of identifying the two actual write points from among the four potential write points for the current time interval, is to consider the distance from a first actual write point for the preceding time interval and each of the four potential write points for the current time interval, and select the potential write point associated with the shortest distance, and separately consider the distance between the second actual write point for the preceding time interval and the remaining potential write points for the current time interval and select the current point associated with the shortest distance. In this alternative, the system control unit 16 calculates the distances between each of the four potential write points for the current time interval and a first actual write point for the preceding time interval, and selects as a first actual write point for the current time interval, the potential point which has minimum distance from the first actual point for the preceding time interval. In the case of FIG. 12, the system control unit 16 calculates the distance between the potential write points having the coordinates (Xb1,Yb1), (Xb1,Yb2), (Xb2,Yb1), (Xb2,Yb2) and the actual write point having the coordinates (Xp1,Yp2), and selects the write point having the coordinates (Xb1,Yb2) as the first actual write point (X1,Y1) for the current time interval. Separately, e.g., at a later time, the system control unit 16 similarly selects the second actual write point for the current time interval, the point having the coordinates (X2,Y2) on the basis of the distances of the remaining potential point(s) from the actual point (Xp2, Yp1) for the preceding time interval.

While in embodiment discussed immediately above in connection with FIGS. 6–13b, the coordinate input device uses glass for the transparent panel 1 in which SAW energy propagates, it should be clear that other materials can be used in which SAW energy can propagate for similar purposes.

Figure 2:
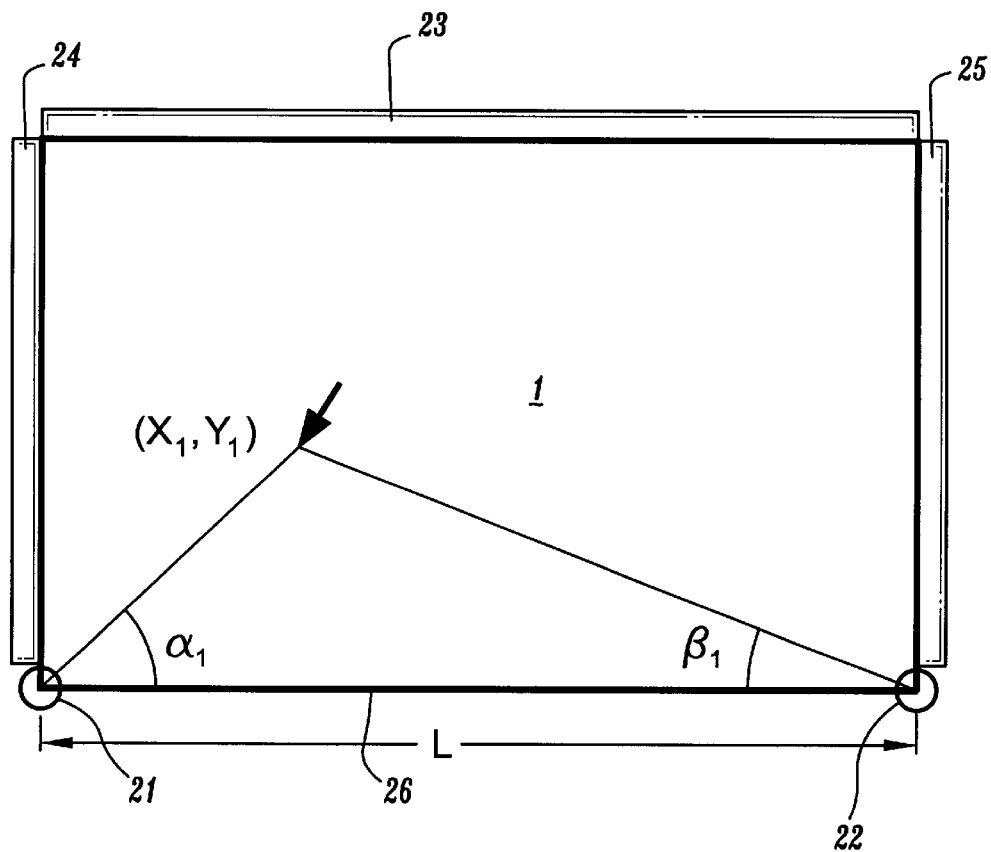
FIG. 2 illustrated another earlier coordinate input device, using beams of light.
Figure 3:
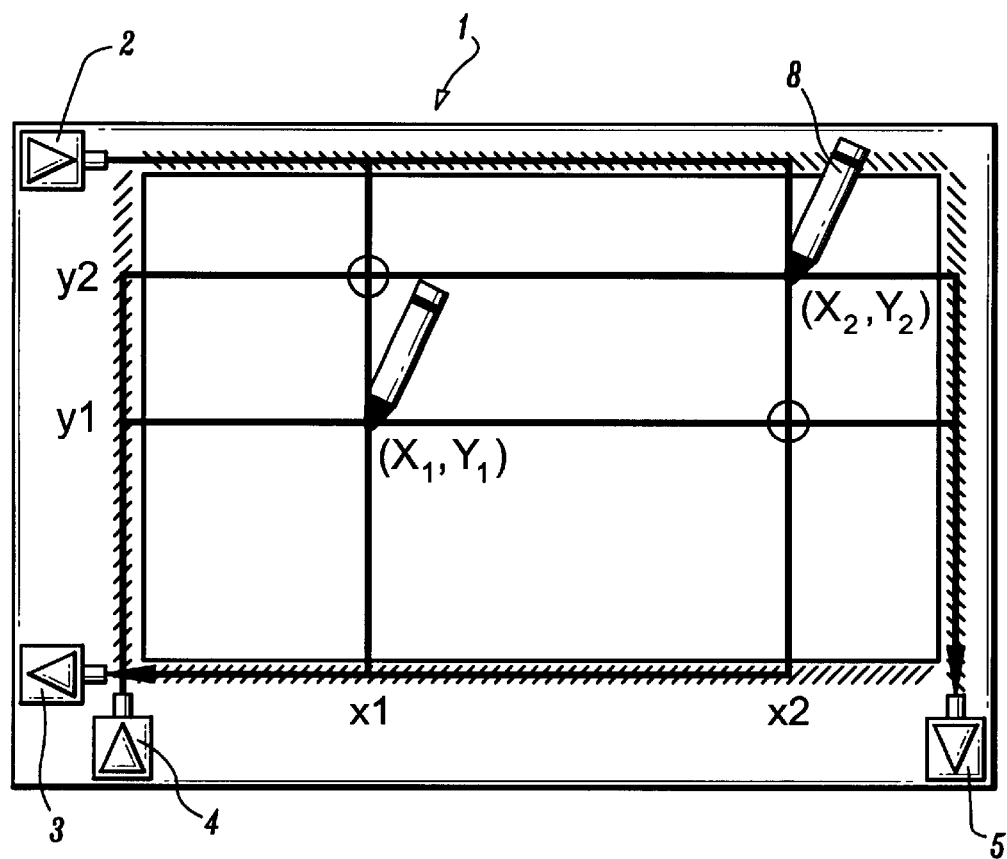
FIGS. 3 and 4 are diagrams used in explaining a problem in using the device of FIG. 1.
Figure 4:
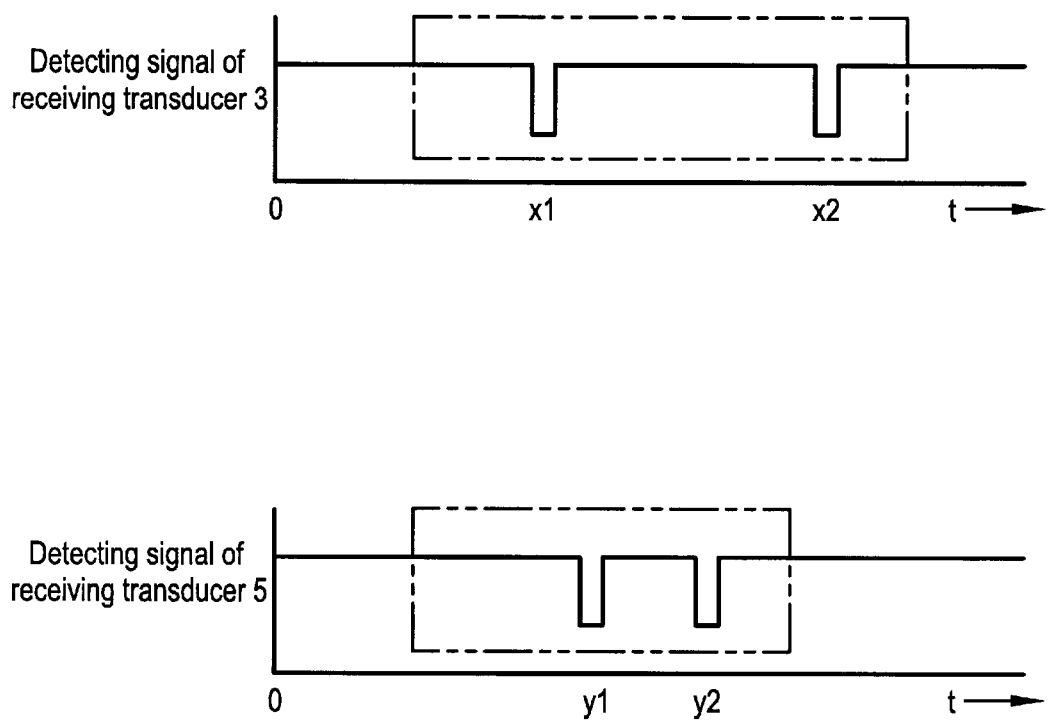
Figure 5:
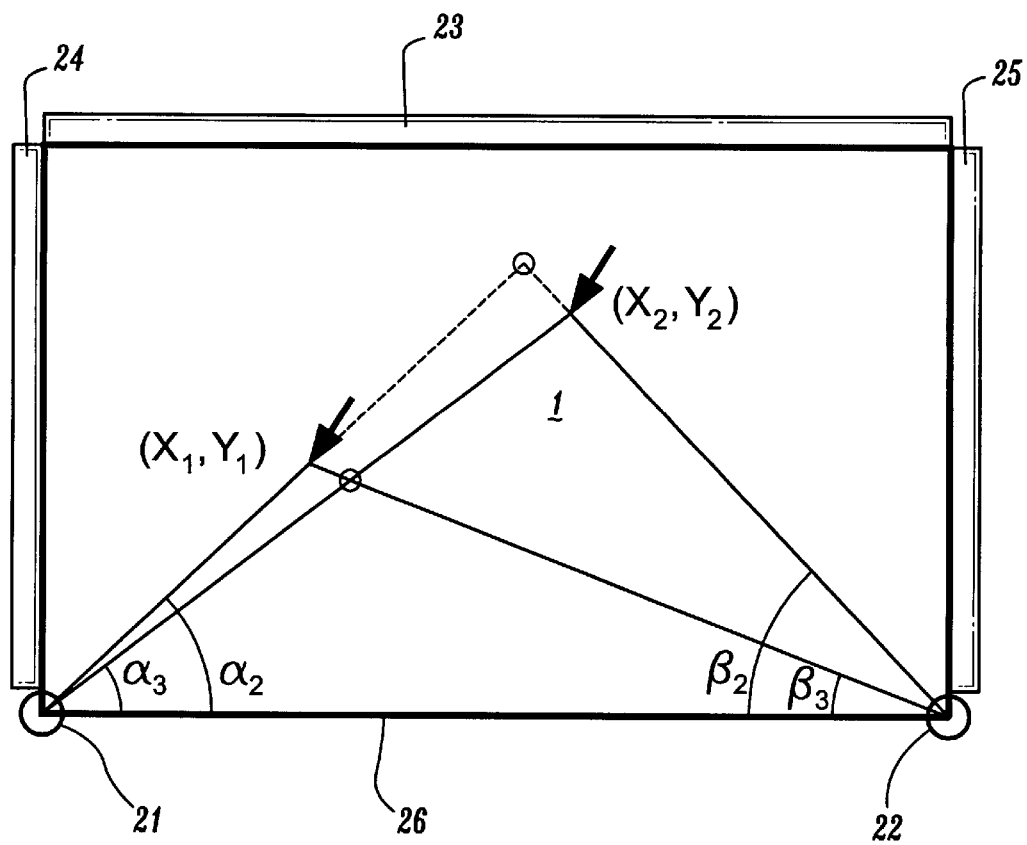
FIG. 5 is a diagram used in explaining a problem in using the device of FIG. 2.

Next, a description will now be given of another embodiment of a coordinate input device with reference to FIGS. 14 to 18, where the elements that correspond to elements in FIG. 2 are designated by the same reference numerals and a duplicate description thereof is omitted.

Figure 14:
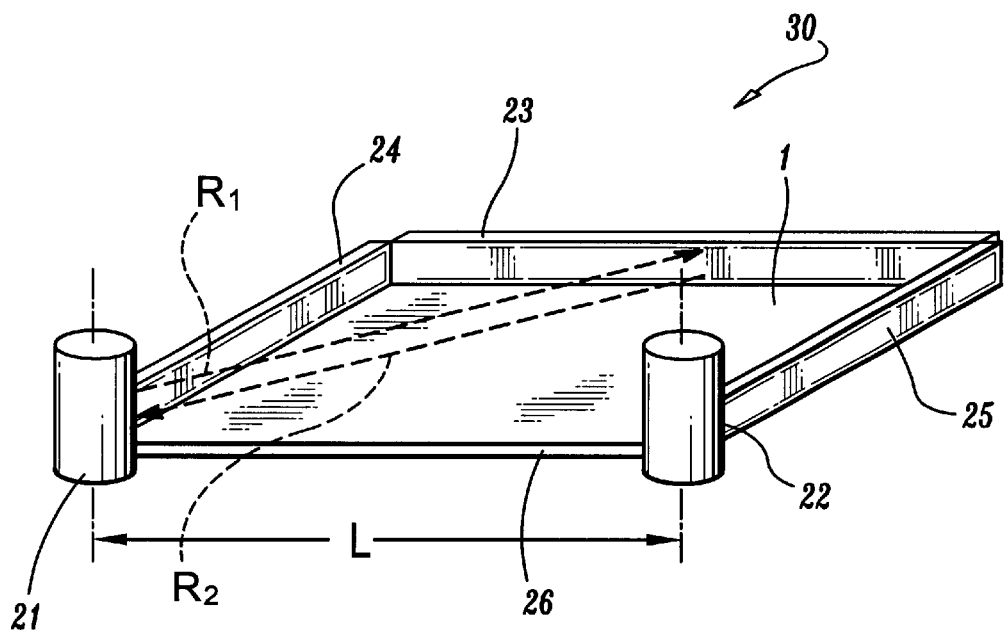
FIG. 14 is a perspective view illustrating an embodiment of a coordinate input device described below.

As seen in FIG. 14, the image display system 10 has another type of a coordinate input device 30. The coordinate input device 30 in FIG. 14 comprises a transparent writing panel 1 covering a display screen of an image display system, light scanners 21 and 22 at the lower left and right corners, respectively, of the writing panel 1, a corner cube array 23 at the top side of the writing panel 1 and corner cube arrays 24 and 25 at the left and right sides of the writing panel 1, respectively.

Figure 15:
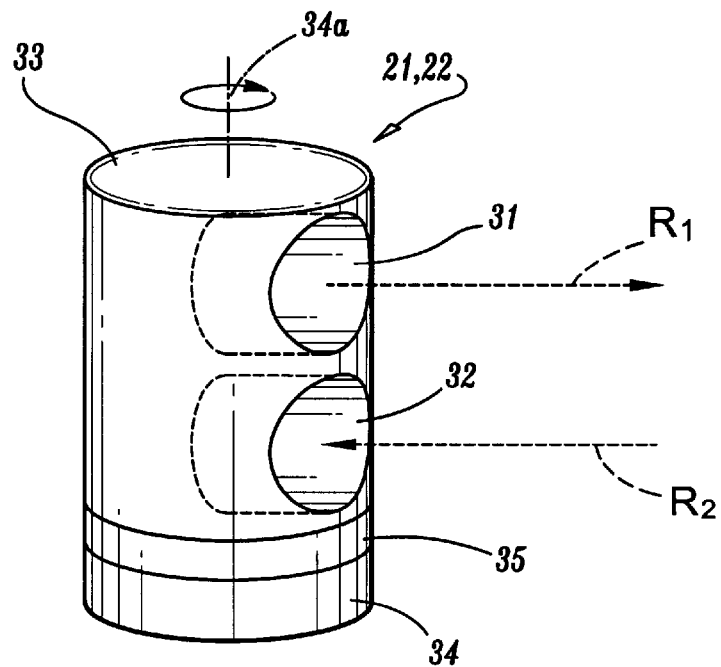
FIG. 15 is a perspective view of a light scanner for the coordinate input device of FIG. 14.

As seen in FIG. 15, each of the light scanners 21 and 22 has a light-producing device 31 producing a light beam R1 extending parallel with the surface of writing panel 1 and a photoreceptor device 32 receiving a reflected light beam R2. The light-producing device 31 and the photoreceptor device 32 are housed in a cover 33. Each of the light scanners 21 and 22 further has a motor unit 34 that is coupled to the cover 33 and rotates the cover 33 in a predetermined direction continuously, and a rotary encoder 35 which detects the rotational angle of the cover 33.

The light scanner 21 is rotated in a counterclockwise direction about an axis 34a by the motor unit 34 and repeatedly sweeps the emitted light beam R1 and reflected beam R2 within the angle between the left and bottom edges of the writing panel 1. The light scanners 22 is rotated in a clockwise direction about an axis 34a by the motor unit 34 also repeatedly and sweeps its light beams R1 and R2, but within the angle between the right and bottom edges of the writing panel 1. Each of the light scanners 21 and 22 outputs a high level signal to the system control unit 16 when the photoreceptor device 32 receives a sufficient light energy within its reflected beam R2 and outputs a low level signal to the system control unit 16 when the photoreceptor device 32 does not receive sufficient light energy within its reflected beam R2. The rotary encoder 35 outputs a pulse signal to the system control unit 16 indicative of the rotational angle so that the level of the signal from photoreceptor device 32 can be related to the angular position of the beams R1 and R2.

Figure 16A:
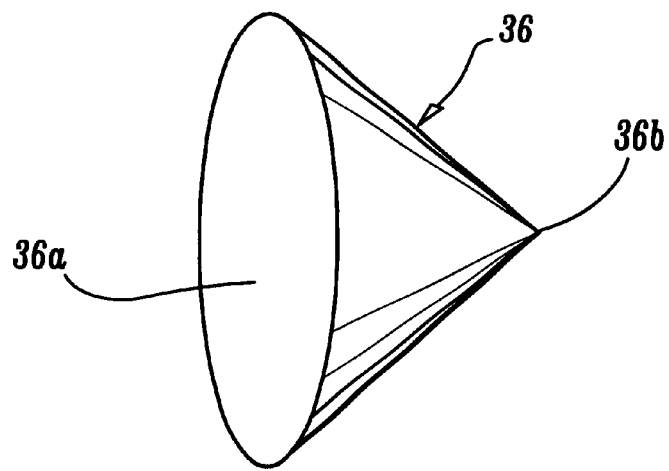
FIGS. 16a and 16b illustrate a reflection cell for the coordinate input device of FIG. 14.
Figure 16B:
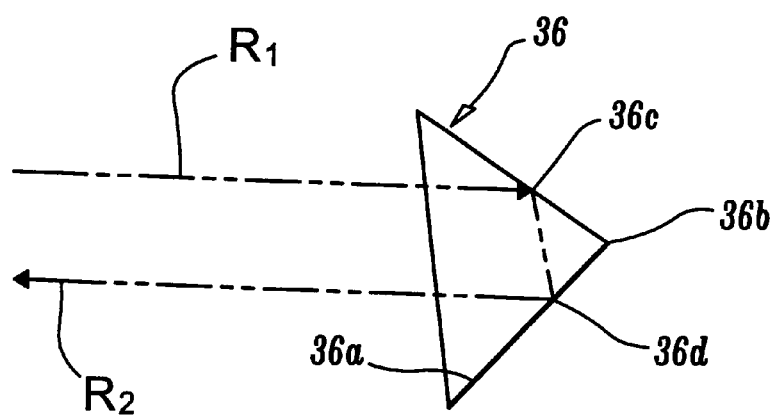

In the embodiment of FIG. 15, the corner cube arrays 23 to 25 are respective linear arrays of reflection cells 36 extending along the top and side edges of the writing panel 1. As seen in FIGS. 16a and 16b, in this exemplary embodiment each reflection cell 36 is conical and has a reflector 36a formed at the inside surfaces of the reflection cell 36. A cross section including an apex 36b of the reflection cell 36 forms a right angle. As the light beam R1 from the light scanners 21 and 22 sweeps the writing panel 1, it enters into successive reflection cells 36 of the corner cube arrays 23 to 25, and is reflected at 36c (FIG. 16b) toward another spot 36d of the reflector 36, where it is again reflected and becomes the reflected beam R2 directed to the photoreceptor device 32 of the light scanners 21 and 22.

When the operator brings the input pen to the writing panel 1 by the input pen and obscures the beam R1 (and/or R2) at a given angular position of R1, the photoreceptor device 32 does not receive the reflected light beam R2 (or does not receive a sufficient light energy within R2), and the light scanners 21 and 22 output a low level signal to the system control unit 16 for the angular positions that correspond to the write point where beam R1 is obscured. The system control unit 16 calculates an ascending vertical angle from a lower horizontal line 26 of the writing panel 1 on the basis of the pulse signals from the rotary encoder 35.

Figure 17:
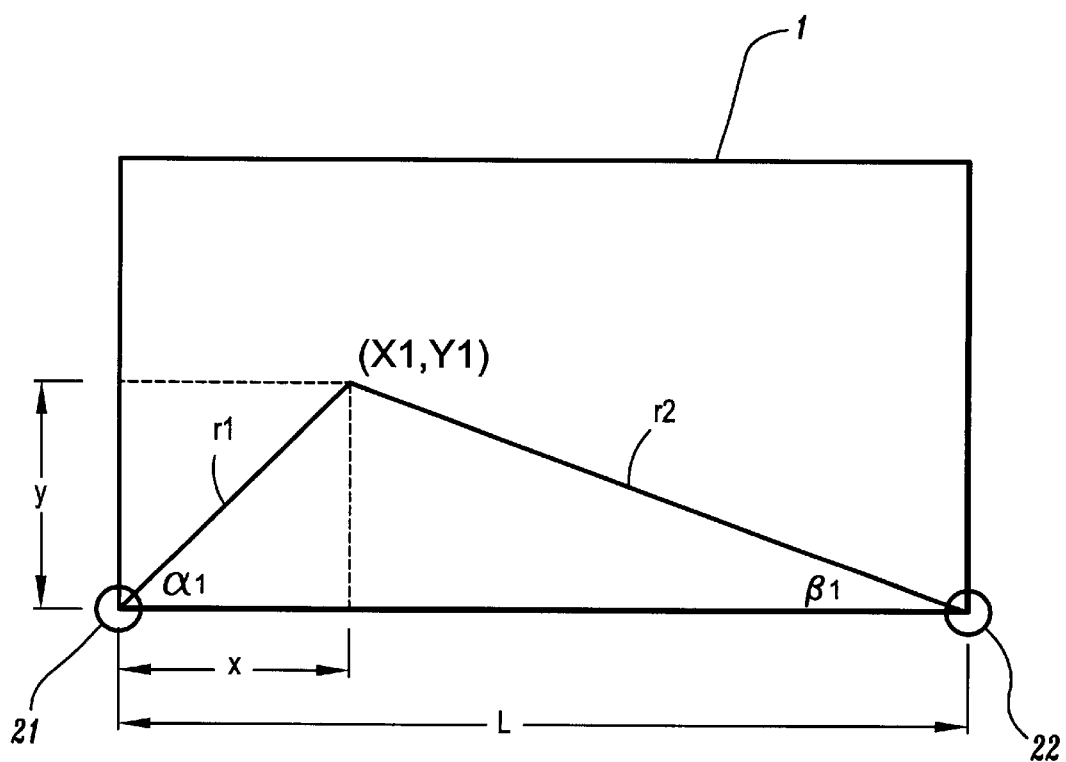
FIG. 17 illustrates coordinate detection in the coordinate input device of FIG. 14.

Referring to FIG. 17, the system control unit 16 determines the coordinates (X1,Y1) of the write point, using the measured ascending angles a1 and B1 and the known distance L between the light scanners 21 and 22, to calculate the illustrated distances x and y as follows, which in turn allows the calculation of the coordinates (X1,Y1) in accordance with the following expressions:

$$y = \tan(\alpha 1) x$$

$$y = \tan(\beta 1)(x-L)$$

$$X1 = [\tan(\beta 1)/\{\tan(\alpha 1) + \tan(B1)\}] L$$

$$Y1 = [\tan(\alpha 1) \tan \beta 1)]\{\tan \alpha 1) + \tan(\beta 1\}] L$$

Figure 18:
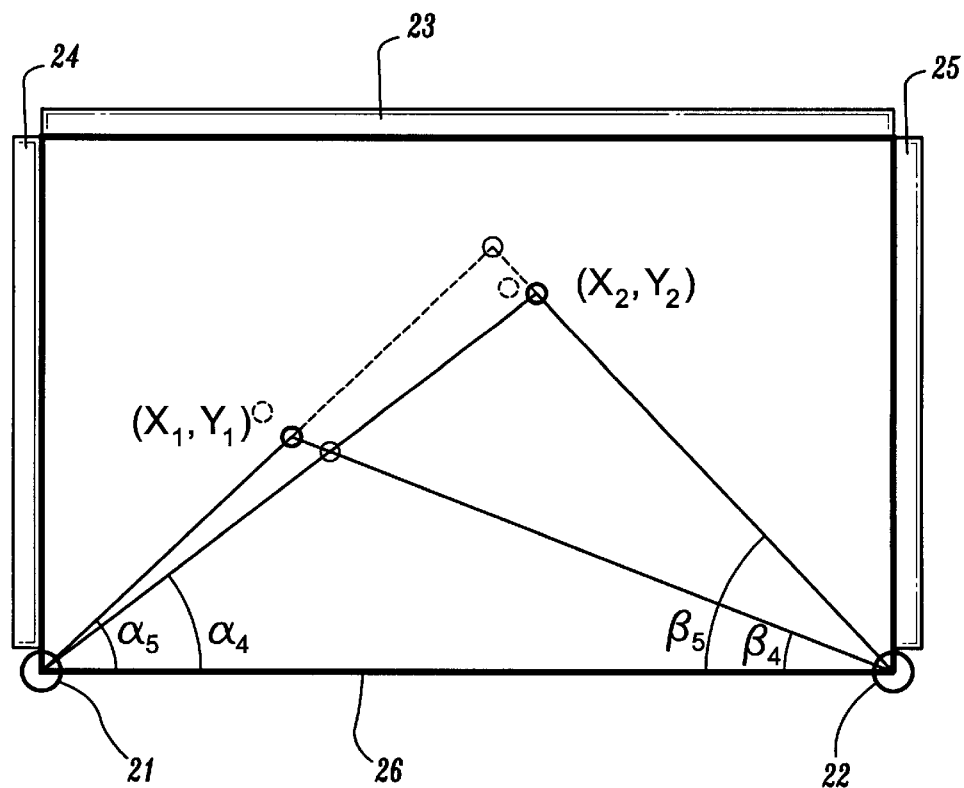
FIG. 18 illustrates another embodiment of a coordinate input device described below.

Referring to FIG. 18, if the user indicates plural points by obstructing the beams R1(R2) at plural points, for example at point (X1,Y1) and at point (X2,Y2), the system control unit 16 detects four potential write points, including the two incorrect points shown by thin line circles in FIG. 18. To resolve the ambiguity and select the two actual write points from among the four potential write points, the system control unit 16 carries out processes similar to those carried out for the corresponding purpose in connection with the embodiment that uses the propagation of SAW, as describe above. As one alternative, the system control unit 16 considers the possible combinations of coordinates of the four potential points found in a single sweeping period and selects the two combinations in which the X-coordinate and the Y-coordinate are measured at times closest to each other, assuming that the sweeps of the two light beams R1 have been synchronized relative to the bottom of the panel 1 (physically or by shifting the information derived from the sweeps). A second alternative, and again in a manner similar to that described above in connection with the SAW embodiment, the system control unit 16 seeks four coordinates (defining two actual write points) on the basis of the distance from the four respective coordinates found for the two correct write points for the immediately preceding time interval (sweeping periods Tn−1 and Tm−1), and selects as the two actual write points for the current sweeping period, the four coordinates closest in distance to the respective coordinates of the two correct write points found in the immediately preceding sweeping period. As yet another approach to resolving the ambiguity, the system control unit 16 calculates the distances between the coordinates of the four potential points for the current sweeping period and the coordinates of one of the two actual write points found for the immediately preceding time interval and selects the potential write point that has minimum distance from the actual write point for the preceding time interval, and then carries out a similar process to find the second actual write point for the current time interval, which again is similar to a process described above for the embodiment using SAW.

In this embodiment, in the process of selecting the two actual write points from among four potential points, the system control unit 16 measures the ascending angles $\alpha 4$ and $\beta 5$ illustrated in FIG. 18 for the light scanners 21 and the ascending angles $\beta 4$ and $\beta 5$ for the light scanners 22. The system control unit 16 calculates the time difference between the instant at which each of angles $\alpha i$ (i=4,5) was detected and the instant at which each of angles $\beta i$ (i=4,5) was detected. The system control unit 16 considers the calculated time difference for the combinations ($\alpha 4,\beta 4$), ($\alpha 5,\beta 5$) and the combination ($\alpha 4,\beta 5,\alpha 5,\beta 4$) in a manner similar to that described for the case of the SAW embodiments, and identifies the two actual write points for the current time interval on the basis of the minimum calculated time difference.

A number of variations are possible. As some non-limiting and non-exhaustive examples, the shape of the reflection cell 36 can be something other than conical, e.g., the cell 36 can be pyramid-shaped. The motor unit 34 can drive the light scanners 21 and 22 alternately clockwise and counterclockwise to sweep the respective beams R1 and R2 only within the angle between the bottom of panel 1 and the respective side. A rotating optical polygon can be used to reflect and sweep the beams R1 and R2 instead of rotating the light scanners 21 and 22.

This disclosure incorporates by reference the entire contents of the Japanese priority patent application 09-186119 filed in Japan on Jul. 11, 1997.

Numerous modifications and variations of the disclosed system and method are possible in light of the above teachings. It is therefore to be understood that within the scope of the appended claims, the invention may be practiced other than as specifically described herein.

What is claimed is:

1. A coordinate input device comprising:
   a write point detecting circuit repetitively detecting and outputting first coordinates and second coordinates, wherein a pair of coordinates including a first coordinate and a second coordinate defines a position of a respective write point; and
   a coordinate determining circuit determining coordinates of write points on the basis of the output of the write point detecting circuit,
   wherein in case plural first coordinates and/or plural second coordinates are detected and outputted by the write point detecting circuit for a single selected period, said plural coordinates yielding a greater number of potential write points than an actual number of write points for the period, said coordinate determining circuit compares a time of detection of the plural first coordinates and the time of detection of the plural second coordinates for each potential write point and selects for the actual write points, respective pairs of coordinates each comprising a first coordinate and a second coordinate that have the shortest times between the detection of the first and the second coordinate of the pair by the write point detecting circuit.

2. A coordinate input device according to claim 1, said write point detecting circuit includes an X-axis position detecting means for detecting X-axis positions of write points and a Y-axis position detecting means for detecting Y-axis positions of write points.

3. A coordinate input device according to claim 2, wherein said X-axis detecting means and Y-axis detecting means include a transmitter transmitting surface acoustic waves into a field that includes said actual write points and a receiver receiving reflections of said surface acoustic waves.

4. A coordinate input device according to claim 1, wherein said write point detecting circuit includes a transmitter transmitting light into a field that includes said actual write points and a receiver receiving reflections of said light.

5. A coordinate input device according to claim 1, wherein the write point determining circuit repetitively detects X-positions within an X-sweeping period and Y-positions within a corresponding Y-sweeping period that has a different duration from the corresponding X-sweeping period, and corrects for time differences between the X-axis sweeping period and the Y-axis sweeping period.

6. A coordinate input device according to claim 5, wherein said write points determining circuit effectively equalizes the durations of corresponding X-axis and Y-axis sweeping periods.

7. A coordinate input device according to claim 5, wherein said coordinate determining circuit selects for the actual write points within corresponding sweeping period the pairs of an X-position and a Y-position each that have the shortest time spans between the detection of the X-position and the Y-position within a pair.

8. An image display system comprising:
a write point detecting circuit detecting first coordinates and second coordinates of potential write points, each potential write point defined by a respective pair of a first coordinate and a second coordinate, said potential write points including a lesser number of actual write points, and providing an output related to the detected coordinates; and
a coordinate determining circuit determining coordinates of the actual write points on the basis of the output of the write point detecting circuit and providing an output related to said coordinates,
a display circuit displaying image data on the basis of the output of said coordinate determining means;
wherein if coordinates corresponding to plural potential write points are detected within a selected time period by the write point detecting circuit, said coordinate determining circuit selects pairs of a first and a second coordinate each of the actual write points based on the times at which the first and second coordinates of the pair were detected by the write point detecting circuit by comparing a time of detection of the plural first coordinates and the time of detection of the plural second coordinates for each potential write point, said coordinate determining circuit selecting for the actual write points, respective pairs of coordinates each comprising a first coordinate and a second coordinate that have the shortest times between the detection of the first and the second coordinate of pair by the write point detecting circuit.

9. An image display system according to claim 8, wherein said write point detecting circuit includes an X-axis position detecting means for detecting X-axis positions of write points and a Y-axis position detecting means for detecting Y-axis positions of write point.

10. An image display system according to claim 9, wherein said X-axis detecting means and Y-axis detecting means include a transmitter transmitting surface acoustic waves into a field that includes said actual write points and a receiver receiving reflections of said surface acoustic waves energy.

11. An image display system according to claim 8, wherein said write point detecting circuit includes a transmitter transmitting light into a field that includes said actual write points and a receiver receiving reflections of said light.

12. An image display system according to claim 8, wherein the write point determining circuit repetitively detects X-positions within an X-sweeping period and Y-positions within a corresponding Y-sweeping period that has a different duration from the corresponding X-sweeping period, and corrects for time differences between an X-axis sweeping period and the corresponding Y-axis sweeping period.

13. An image display system according to claim 12, wherein said write point detecting circuit effectively equalizes the corresponding X-sweeping and Y-sweeping periods.

14. A coordinate input device according to claim 12, wherein said coordinate determining circuit selects for the actual write points within a sweeping periods the pairs of an X-position and a Y-position that have the shortest time spans between the detection of the X-position and Y-position within a pair.

15. A system comprising:
an input device having a panel for indicating actual write points;
a coordinate detector operating for each of a succession of time intervals to identify a first coordinate and a second coordinate for each actual write point indicated for the respective time interval, wherein said coordinates provide combinations of a first and a second coordinate each for potential write points whose number exceeds the number of the actual write points;
a selector processing said coordinates to select the actual write points for the time interval from among the potential write points through calculations making use of the times of detection of the first and second coordinates by the coordinate detector for each of the combinations of the first and the second coordinate for the potential write points, said selector identifying pairs of a first and a second coordinate each that define the positions of said actual write points, said selector selecting for the actual write points, respective pairs of coordinates each comprising a first coordinate and a second coordinate that have the shortest times between the detection of the first and the second coordinate of the pair by the coordinate detector; and
a display circuit using said pairs of coordinates.

16. A system as in claim 15 in which the coordinate detector comprises a source of energy that sweeps, for each of said time intervals, a field that includes said actual write points, and a detector of reflections of said energy that vary in a parameter related to whether the energy has interacted with an indication of an actual write point.

17. A system as in claim 16 in which the energy sweeping the field comprises surface acoustic waves propagating along said panel and reflected at sides of the panel to generate said reflections, and wherein said parameter comprises an amplitude of the reflections, said amplitude being affected by touching the panel at said actual write points to thereby attenuate one or more of said reflections.

18. A system as in claim 16 in which the energy sweeping the field comprises a light beam repetitively sweeping said panel and reflected at sides of the panel to generate said reflections, and wherein said parameter comprises an amplitude of the reflections, said amplitude being affected by obstructing the beam and/or said reflections at said actual write points to thereby attenuate one or more of said reflections.

19. A system as in claim 15, in which said selector carries out calculations making use of the time between the detection of a first coordinate and the detection of each of at least two second coordinates by the coordinate detector for the respective time interval to thereby facilitate the selection of said actual write points from among the potential write points.

20. A system as in claim 15, in which said selector carries out calculations making use of testing actual write points identified for a preceding time interval relative to potential write points identified for a current time interval to thereby facilitate the selection of the actual write points from among the potential write points for the current time interval.

21. A system as in claim 20 in which the testing comprises comparing the distance between an actual write point identified for the preceding time interval and two or more potential write points identified for a current time interval.

22. A system as in claim 20 in which the testing comprises comparing the distance between a first coordinate of an actual write point identified for the preceding time interval and the first coordinate of each of two or more potential write points identified for a current time interval.

23. A method comprising:

indicating actual write points on a panel;

for each of a succession of time intervals, detecting a first coordinate and a second coordinate for each actual write point indicated for the respective time interval, wherein said coordinates provide combinations of a first and a second coordinate each for potential write points whose number exceeds that of the actual write points;

processing said coordinates to select the actual write points for the time interval from among the potential write points through calculations making use of the times of detection of the first and second coordinates for the respective time interval for each of the combinations of the first and the second coordinate for the potential write points, to thereby identify pairs of a first and a second coordinate identifying the positions of said actual write points for the time interval, said processing selecting for the actual write points, respective pairs of coordinates each comprising a first coordinate and a second coordinate that have the shortest times between the detection of the first and the second coordinate of the pair; and using said pairs of coordinates in a display operation.

24. A method as in claim 23 in which the detecting of said coordinates for each of said time intervals comprises sweeping said panel with energy and detecting reflections of said energy that vary in a parameter related to whether the energy has interacted with an indication of an actual write point.

25. A method as in claim 24 in which the energy comprises surface acoustic waves propagating along said panel and reflected at sides of the panel to generate said reflections, and wherein said parameter comprises an amplitude of the reflections, said amplitude being affected by touching the panel at said actual write points to thereby attenuate one or more of said reflections.

26. A method as in claim 24 in which the energy a light beam sweeping said panel and reflected at sides of the panel to generate said reflections, and wherein said parameter comprises an amplitude of the reflections, said amplitude being affected by obstructing the beam and/or said reflections at said actual write points to thereby attenuate one or more of said reflections.

27. A method as in claim 23 in which said processing comprises calculations making use of the time between the detection of a first coordinate and the detection of each of at least two second coordinates for the respective time interval to thereby facilitate the selection of said actual write points from among the potential write points for the current time interval.

28. A method as in claim 23 in which said processing comprises calculations making use of testing actual write points identified for a preceding time interval relative to potential write points identified for a current time interval to thereby facilitate the selection of the actual write points from among the potential write points for the current time interval.

29. A method as in claim 28 in which the testing comprises comparing the distance between an actual write point identified for the preceding time interval and two or more potential write points identified for a current time interval.

30. A method as in claim 28 in which the testing comprises comparing the distance between a first coordinate of an actual write point identified for the preceding time interval and the first coordinate of each of two or more potential write points identified for a current time interval.

* * * * *